Oct. 16, 1962    R. S. WATERS    3,059,090
SPACE HEATER
Filed Dec. 1, 1960
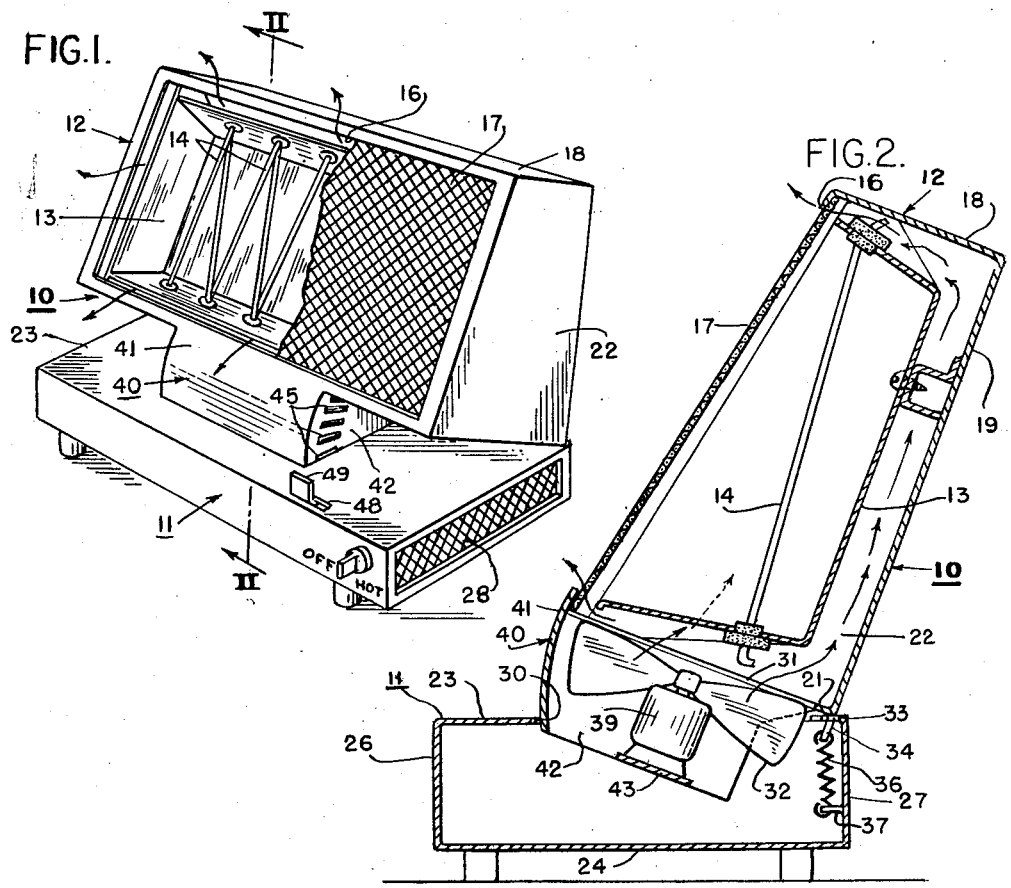
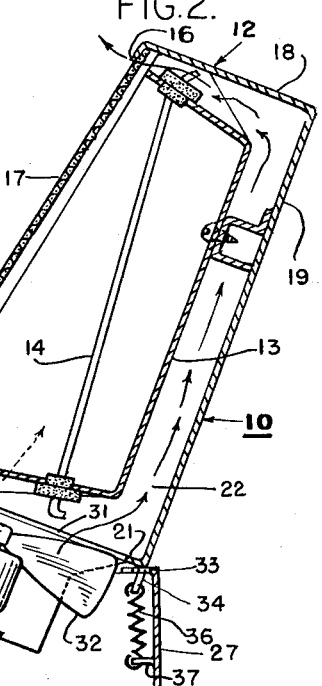
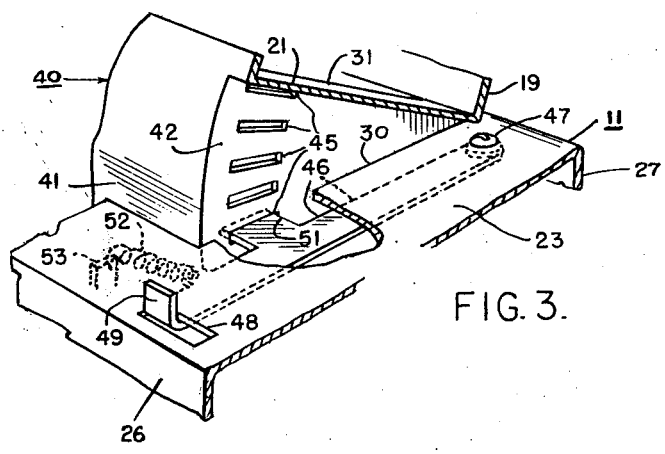
INVENTOR
ROBERT S. WATERS
BY
ATTORNEY

United States Patent Office 3,059,090
Patented Oct. 16, 1962

3,059,090
SPACE HEATER
Robert S. Waters, Lexington, Ohio, assignor to Westinghouse Electric Corporation, East Pittsburgh, Pa., a corporation of Pennsylvania
Filed Dec. 1, 1960, Ser. No. 73,109
2 Claims. (Cl. 219—39)

This invention relates to space or room heaters, more particularly to such heaters of the smaller size which are considered to be "portable" and which normally direct heat therefrom in one direction, and has for an object to enable the user to effect discharge of heat from such a heater any one of a plurality of selectable directions.

Yet another object of the invention is to provide, in a room heater having a casing which encloses a heating element, and a base for supporting the casing in spaced relation to a supporting surface, novel means whereby the casing may be tilted relative to its supporting structure so that the direction of discharge of heated air from the casing, relative to the supporting surface, may be varied.

Briefly, the invention may be incorporated in a room heater having a base upon which is tiltably supported a casing which houses the usual heating element and means such as a reflector or a fan, or both, for directing heated air through an open front of the casing. The tiltable connection between the casing and the base may be effected by having lugs on either the casing or the base extend through aligned mating slots in the base or casing, respectively, adjacent the lower rear edge of the casing. The casing and base may be provided with aligned openings through the top of the base and the bottom of the casing for passage of air from the base to the interior of the casing and ductwork is provided for insuring a closed passageway between the two openings when the casing is tilted upwardly or rearwardly relative to the base. When the casing is in normal, or untilted, relation to the base, the ductwork is housed within the base while still permitting flow of air from the latter to the casing.

The foregoing and other objects are effected by the invention as will be apparent from the following description and claims taken in connection with the accompanying drawing, forming a part of this application, in which:

FIG. 1 is a perspective view of a room heater incorporating the present invention;

FIG. 2 is a vertical sectional view, taken along the line II—II of FIG. 1, looking in the direction of the arrows; and FIG. 3 is an enlarged fragmentary perspective view of a portion of the structure shown in FIG. 1, illustrating the means for retaining the casing tilted relative to the base.

Referring now to the drawing, the room heater, indicated in its entirety by the reference character 10, includes a base 11 and a casing 12 tiltably mounted on the base. The casing 12 may include a reflector 13 disposed in spaced relation with respect to the walls of the casing 12, and a heating element 14 disposed between the reflector and an open front 16 of the casing. Preferably, the casing open front 16 is protected by suitable grille work 17.

The casing is provided with a top wall 18, a rear wall 19, a bottom wall 21 and end walls 22.

The base 11 is provided with top and bottom walls 23 and 24, respectively, and front and rear walls 26 and 27, respectively. The ends of the base 11 are open but protected by suitable grille work, as at 28, these open ends providing for entry of air to the base for passage therefrom to the interior of the casing through a pair of aligned openings 30 and 31 in the base top wall 23 and the casing bottom wall 21, respectively. A fan 32 produces flow of air through the open ends of the base 11, upwardly through the aligned openings 30 and 31 in the base top wall and the casing bottom wall to the space within the casing between the reflector 13 and the casing wall structure. Heat is directed forwardly through the open front 16 of the casing by radiation from the heating element 14 and at the same time heat is reflected by the reflector 13, also through the open front 16 of the casing. Additionally, convected heat is picked up by the air flowing through the space between the reflector and the casing wall structure, this heated air likewise discharging forwardly around the periphery of the casing open front, as indicated by the solid arrows in FIGS. 1 and 2.

In conventional heaters of this general type, where the casing is fixed with respect to the base, the direction of discharge of heat, relative to the floor or other supporting surface for the heater, is substantially constant except as effected by air currents in the atmosphere surrounding the heater. Many users of such room heaters would prefer, at times, to have the stream of heated air directed upwardly at a greater angle with respect to the floor than is provided by conventionally constructed heaters. To meet this desire on the part of many users of such heaters, the present invention provides for tilting of the heater casing relative to its supporting base to direct the discharging stream of hot air upwardly at a greater angle with respect to the floor or other supporting surface than would be normally available without this tilting feature. Furthermore, the invention provides for selection by the user of any one of a plurality of different angles of discharge of heated air through the casing open front, relative to the supporting surface or floor.

Accordingly, the casing 12 is pivotally mounted, along the juncture line of its bottom wall 21 and its rear wall 19, adjacent the rear upper edge of the base 11. This pivotal mounting is of extreme simplicity in that it involves merely the provision of a pair of slots 33 provided in the base top wall 23 adjacent the rear edge thereof and also preferably fairly close to the ends of the top wall. The casing 12 is provided with a pair of tabs 34, preferably formed integral with either the casing bottom wall 21 or rear wall 19 which extend downwardly through the slots 33. The inner or lower ends of the tabs 34, disposed within the base 11, are biased downwardly by tension springs 36, the upper ends of which engage in openings in the tabs 34 and the lower ends of which engage in tabs 37, preferably struck out from the material of the base rear wall 27, and located within the base as best shown in FIG. 2. Since the mating of these tabs and slots are the only connecting means between the casing and its base, it should be apparent that the casing may be readily tilted rearwardly about an axis coinciding with the line of intersection or jointure of the casing bottom wall 21 and rear wall 19.

While the pivotal connection above described, and illustrated in the drawing, involves provision of slots in the base and tabs carried by the casing, it is believed obvious that this construction may be reversed to provide slots in the bottom wall of the casing and tabs extending upwardly from the top wall of the base.

As previously mentioned, flow of air from the interior of the base 11 to the interior of the casing 12 is effected by the fan 32, such flow from the base to the casing passing through the vertically aligned openings 30 and 31 in the base top wall and the casing bottom wall. It will be apparent that, with the casing tilted with respect to its base, it becomes necessary to provide ductwork between the casing and the base, at the periphery of the openings 30 and 31, to insure maintenance of air flow from the base to the interior of the casing. Accordingly, there is provided ductwork 40 including a front wall 41 and side walls 42. These walls are fixed to the casing structure and are of sufficient height to extend through the opening 30 in the base top wall 23 even when the casing 12 is tilted rearwardly to its maximum limit. It has been found convenient to mount the fan 32 and its motor 39 on a cross bar or strip 43 carried by the ductwork side walls 42, near the lower edge thereof, as best shown in FIG. 2.

In order that the user may select any one of a plurality of available angles of tilting of the casing with respect to the base or supporting surface on which the latter rests, one side wall 42 of the ductwork 40 is provided with a plurality of slots 45 near the forward edge thereof and so disposed that, when each slot is positioned adjacent the top wall 23 of the base, its longitudinal axis is parallel thereto. A locking lever 46 (FIG. 3) is pivotally mounted at its rear end, as at 47, against the under surface of the base top wall 23, this pivotal mounting permitting the forward end of the lever to be moved transversely of the base to the limited extent permitted by the slot 48 in the base top wall 23, through which projects vertically a finger piece 49. This limited movement of the forward end of the lever, as effected through movement of the finger piece 49, is sufficient to provide for engagement or disengagement of a locking tab 51, extending laterally from the lever 46, with respect to any selected one of the plurality of slots 45 in the ductwork side wall 42. The lever 51 is biased into locking engagement by a tension spring 52 connected at one end to the lever 46 and at its other end to a fixed support 53 within the base 11.

While the base construction has been illustrated as including a closed bottom wall 24 with the ends open, as at 28, it will be obvious that the end walls could be closed and the bottom wall provided with one or more openings for admission of air to the interior of the base, and thence, through the ductwork 40, to the casing 12.

While the invention has been shown in but one form, it will be obvious to those skilled in the art that it is not so limited, but is susceptible of various changes and modifications without departing from the spirit thereof.

What is claimed is:

1. In a room heater, a base having wall structure including an upper wall, said structure having an opening therein for entry of air to said base, a casing tiltably supported on said upper wall and having bottom, rear, top and side walls, said base top wall and said casing bottom wall being juxtaposed in one position of said casing relative to said base, one of the last-mentioned walls having a pair of slots therethrough near the rear edge thereof and the other last-mentioned wall having tabs projecting through said slots, spring means secured to said tabs for retaining said casing and base in assembled relation, whereby said casing may be tilted rearwardly about an axis approximately coinciding with the longitudinal axes of said slots, a heating element housed in said casing, said mating casing and base surfaces having substantially aligned openings therethrough for passage of air from the base to the casing, a fan for producing flow of air from said base into said casing in heat absorbing relation to the heating element and for discharge in a heated condition through the open front of the casing, and means providing a conduit connecting the peripheries of said aligned openings to provide a substantially closed flow passage for air from the base to the casing in all positions of tilting of the latter relative to the former.

2. In a room heater, a base having wall structure including an upper wall, said structure having an opening therein for entry of air to said base, a casing tiltably supported on said upper wall and having bottom, rear, top and side walls, said base top wall and said casing bottom wall being juxtaposed in one position of said casing relative to said base, one of the last-mentioned walls having a pair of slots therethrough near the rear edge thereof and the other last-mentioned wall having tabs projecting through said slots, spring means for retaining said casing and base in assembled relation, whereby said casing may be tilted rearwardly about an axis approximately coinciding with the longitudinal axes of said slots, a heating element housed in said casing, said mating casing and base surfaces having substantially aligned openings therethrough for passage of air from the base to the casing, a fan for producing flow of air from said base into said casing in heat absorbing relation to the heating element and for dicharge in a heated condition through the open front of the casing, means providing a conduit connecting the peripheries of said aligned openings to provide a substantially closed flow passage for air from the base to the casing in all positions of tilting of the latter relative to the former, and means for retaining said casing in any selected one of a plurality of different tilted positions.

References Cited in the file of this patent

UNITED STATES PATENTS

| | | |
|---|---|---|
| 1,914,724 | Johnson | June 20, 1933 |
| 2,158,603 | Calhoun | May 16, 1939 |
| 2,469,234 | Lindberg et al. | May 3, 1949 |
| 2,681,061 | Modell | June 15, 1954 |